United States Patent
Kim

(10) Patent No.: US 8,350,671 B2
(45) Date of Patent: Jan. 8, 2013

(54) METHOD AND APPARATUS FOR CONTROLLING NEW MESSAGE ALERT IN PORTABLE WIRELESS TERMINAL

(75) Inventor: Min-Ho Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 1515 days.

(21) Appl. No.: 11/594,302

(22) Filed: Nov. 8, 2006

(65) Prior Publication Data

US 2007/0105572 A1 May 10, 2007

(30) Foreign Application Priority Data

Nov. 9, 2005 (KR) .................. 10-2005-0106794

(51) Int. Cl.
*G08B 5/22* (2006.01)
*H04Q 1/30* (2006.01)

(52) U.S. Cl. ............... 340/7.51; 340/7.52; 340/7.61; 455/412.2

(58) Field of Classification Search ............ 340/7.51, 340/7.52, 7.58, 7.59, 7.61–7.63; 455/412.2, 455/567, 420
See application file for complete search history.

(56) References Cited

U.S. PATENT DOCUMENTS

| | | | |
|---|---|---|---|
| 6,314,306 B1 * | 11/2001 | Harris | 455/566 |
| 6,405,060 B1 * | 6/2002 | Schroeder et al. | 455/566 |
| 6,745,040 B2 * | 6/2004 | Zimmerman | 455/458 |
| 7,043,260 B2 * | 5/2006 | Kim | 455/458 |
| 7,092,743 B2 * | 8/2006 | Vegh | 455/567 |
| 7,373,181 B2 * | 5/2008 | Vogedes et al. | 455/567 |

* cited by examiner

*Primary Examiner* — Nam V Nguyen
(74) *Attorney, Agent, or Firm* — The Farrell Law Firm, P.C.

(57) ABSTRACT

Provided is a method and an apparatus for controlling a NEW MESSAGE alert in a portable wireless terminal. In a sender-side terminal, a NEW MESSAGE alert is set after a message is written. The NEW MESSAGE alert setting is designated at a header of the message. The message having the header with the NEW MESSAGE alert setting is transmitted. In a receiver-side terminal, a message is received and it is determined whether a NEW MESSAGE alert is designated at a header of the received message. If a NEW MESSAGE alert is designated at the header of the received message, the designated NEW MESSAGE alert is generated. Therefore, both a sending user and a receiving user can have equal authority over the NEW MESSAGE alert.

6 Claims, 4 Drawing Sheets ns is becoming more popular, and portable wireless terminals are now being developed to have multi-functional features for satisfying user's demands. In addition to a call function, portable wireless terminals provide various additional functions such as a phone book, game function, scheduler, short message service (SMS), Internet access, and e-mail.

METHOD AND APPARATUS FOR CONTROLLING NEW MESSAGE ALERT IN PORTABLE WIRELESS TERMINAL

PRIORITY

This application claims priority under 35 U.S.C. §119 to an application filed in the Korean Intellectual Property Office on Nov. 9, 2005 and assigned Ser. No. 2005-0106794, the contents of which are incorporated herein by reference.

BACKGROUND OF THE INVENTION

1. Field of the Invention

The present invention relates generally to a message communication method in a portable wireless terminal, and in particular, to a method and an apparatus for controlling a NEW MESSAGE alert in a wireless communication terminal.

2. Description of the Related Art

With the continuing development of the electronic and communication industries, usage of portable wireless terminals is becoming more popular, and portable wireless terminals are now being developed to have multi-functional features for satisfying user's demands. In addition to a call function, portable wireless terminals provide various additional functions such as a phone book, game function, scheduler, short message service (SMS), Internet access, and e-mail.

Among the additional functions, the SMS function is most frequently used. Recently, as portable wireless terminals have become multi-functional, the SMS is being developed into a multimedia messaging service (MMS) that can transmit images as well as text messages. In the following description, the term "message" will be used to include a multimedia message as well as a conventional text-oriented short message.

Conventionally, when receiving a message from a transmitting terminal, a receiving terminal generates a NEW MESSAGE alert using one of a ringtone, a vibration, and a lamp (silence) depending on settings preset by a receiving user. However, if a receiving user is sleeping or doing an important business, the NEW MESSAGE alert (e.g., ringtone) may disturb the receiving user against the sending user's will. On the other hand, if a NEW MESSAGE alert of a receiving terminal is set to "silence", a receiving user may fail to detect an urgent message received from a sending user.

As described above, because the NEW MESSAGE alert is unilaterally set by the receiving user, it is impossible to give consideration to the situation of the sending user.

SUMMARY OF THE INVENTION

An object of the present invention is to substantially solve at least the above problems and/or disadvantages and to provide at least the advantages below. Accordingly, an object of the present invention is to provide a method and an apparatus for controlling a NEW MESSAGE alert in a wireless communication terminal.

Another object of the present invention is to provide a method and an apparatus for controlling a NEW MESSAGE alert in a wireless communication terminal according to a sender's designation.

A further object of the present invention is to provide a method and an apparatus for designating a NEW MESSAGE alert in an outgoing message in a wireless communication terminal.

According to one aspect of the present invention, there is provided a method for controlling a NEW MESSAGE alert in a wireless communication terminal. In the method, a NEW MESSAGE alert is set after a message is written. Thereafter, the NEW MESSAGE alert setting is designated at a header of the message, and the message having the header with the NEW MESSAGE alert setting is transmitted.

According to another aspect of the present invention, there is provided a method for controlling a NEW MESSAGE alert in a wireless communication terminal. In the method, a message is received and it is determined whether a NEW MESSAGE alert is designated at a header of the received message. If a NEW MESSAGE alert is designated at the header of the received message, the designated NEW MESSAGE alert is generated.

According to a further aspect of the present invention, there is provided a method for controlling a NEW MESSAGE alert in a wireless communication terminal. In the method, a message including a special character designating a NEW MESSAGE alert is written, and the written message with a header added thereto is transmitted.

According to still another aspect of the present invention, there is provided a method for controlling a NEW MESSAGE alert in a wireless communication terminal. In the method, a message is received and it is determined whether the received message includes a predetermined special character. If the received message includes the predetermined special character, a NEW MESSAGE alert designated by the predetermined special character is generated.

According to still another aspect of the present invention, there is provided a portable wireless terminal for controlling a NEW MESSAGE alert. In the portable wireless terminal, a controller designates the NEW MESSAGE alert setting at a header of the message and transmits the message having the header with the NEW MESSAGE alert setting.

According to still another aspect of the present invention, there is provided a portable wireless terminal for controlling a NEW MESSAGE alert. In the portable wireless terminal, upon receipt a message, a controller determines whether a NEW MESSAGE alert is designated at a header of the received message, and generates the designated NEW MESSAGE alert if the NEW MESSAGE alert is designated at the header of the received message.

According to still another aspect of the present invention, there is provided a portable wireless terminal for controlling a NEW MESSAGE alert. In the portable wireless terminal, a controller transmits a message having the header with a special character designating a NEW MESSAGE alert.

According to still another aspect of the present invention, there is provided a portable wireless terminal for controlling a NEW MESSAGE alert. In the portable wireless terminal, upon receipt a message, a controller determines whether the received message includes a predetermined special character, and generates a NEW MESSAGE alert designated by the predetermined special character if the received message includes the predetermined special character.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail because they would obscure the present invention in unnecessary detail.

The present invention provides a method for controlling a NEW MESSAGE alert in a portable wireless terminal according to a sender's designation. It should be noted that the present invention could be applied to various types of messages such as an SMS message, an MMS message, an enhanced messaging service (EMS) message, and an e-mail message. In the following description, an SMS message is taken as an example.

Figure 1:
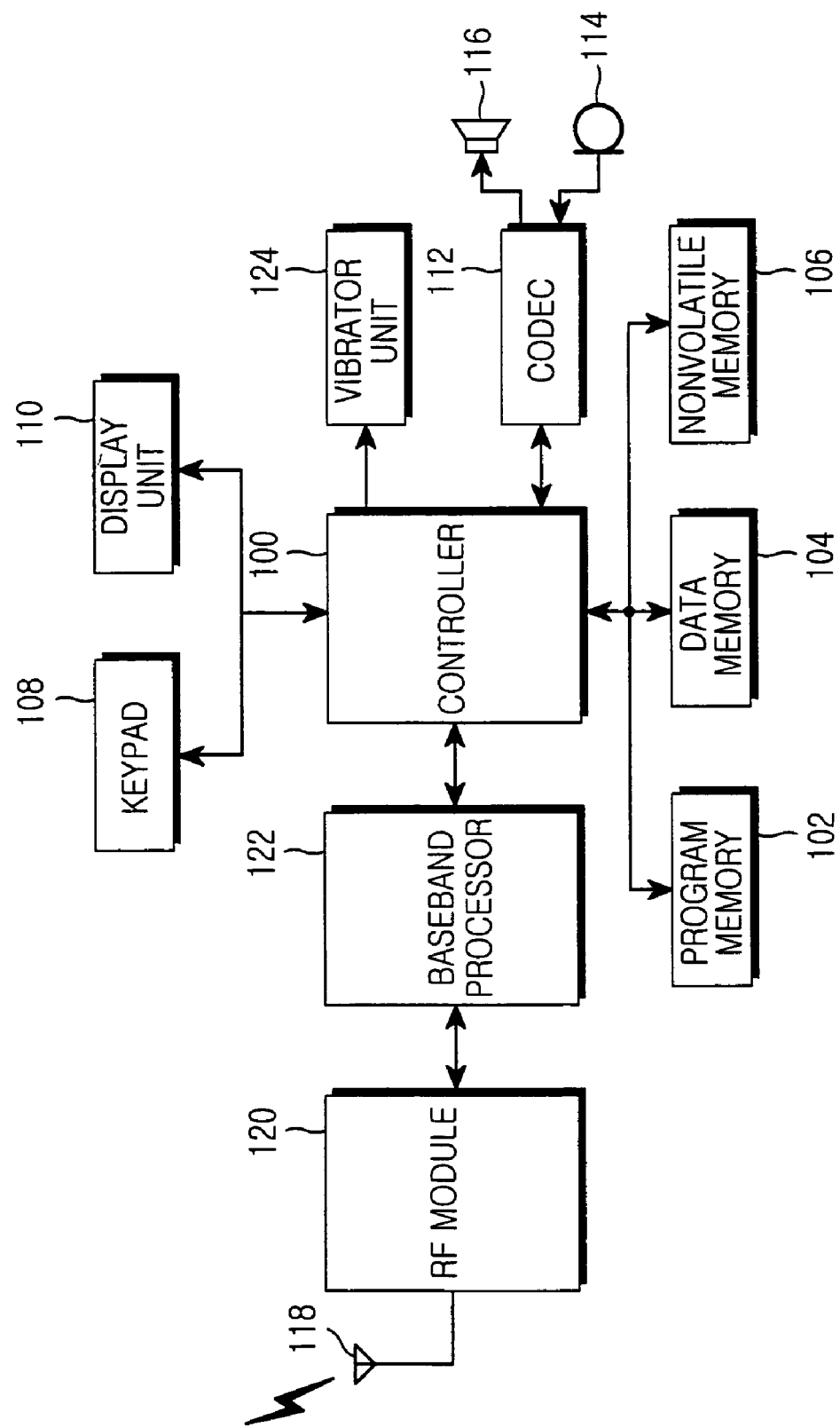
FIG. 1 is a block diagram of a portable wireless terminal according to the present invention.

FIG. 1 is a block diagram of a portable wireless terminal according to the present invention. Examples of the portable wireless terminal are a cellular phone, a Personal Communication System (PCS) terminal, a Personal Data Assistant (PDA), an International Mobile Telecommunications-2000 (IMT-2000) terminal, and a 4G (fourth-generation) broadband system terminal. The following description is made in terms of a general structure of the above terminals.

Referring to FIG. 1, the portable wireless terminal includes a controller 100, a program memory 102, a data memory 104, a nonvolatile memory 106, a keypad 108, a display unit 110, a coder-decoder (CODEC) 112, a microphone 114, a speaker 116, an antenna 118, a radio-frequency (RF) module 120, a baseband processor 122, and a vibrator unit 124.

The controller 100 controls an overall operation of the portable wireless terminal. For example, the controller 100 processes and controls voice communication and data communication. In addition to the general functions, the controller 100 performs a function for controlling a NEW MESSAGE alert in the portable wireless terminal. When the portable wireless terminal transmits an outgoing message, the controller 100 performs a function for designating a NEW MESSAGE alert at the outgoing message (specifically a header or a body of the outgoing message). On the other hand, when the portable wireless terminal receives an incoming message, the controller 100 performs a function for decoding the incoming message to generate a NEW MESSAGE alert that is designated by a sender. A detailed description about the general control operation of the controller 100 will be omitted for conciseness.

The program memory 102, the data memory 104 and the nonvolatile memory 106 constitute a memory unit. The program memory 102 stores a program for controlling the overall operation of the portable wireless terminal. The program memory 102 may be a flash memory. The data memory 104 temporarily stores data generated during the operation of the portable wireless terminal. The data memory 104 may be a random access memory (RAM). The nonvolatile memory 106 stores system parameters and a variety of updatable data such as phone numbers, SMS messages, and image data. The nonvolatile memory 106 may be an electrically erasable programmable read-only memory (EEPROM).

The keypad 108 includes numeric keys of digits 0-9 and a plurality of function keys, such as a Menu key, a Cancel (delete) key, a Confirmation key, a Talk key, an End key, an Internet connection key, and Navigation keys (▲/▼/◄/►). The keypad 108 provides the controller 100 with key input data corresponding to a key pressed by a user. The display unit 110 displays status information (or indicators) generated during the operation of the portable wireless terminal, numerals and characters, moving pictures and still pictures, and so on. The display unit 110 may be a color liquid crystal display (LCD).

The CODEC 112 connected to the controller 100, and the speaker 116 and the microphone 114 connected to the CODEC 112 constitute a voice input/output block that is used for voice communication. The CODEC 112 converts Pulse Code Modulation (PCM) data received from the controller 100 into analog voice signals and outputs the analog voice signals to the speaker 116. Also, the CODEC 112 converts voice signals received from the microphone 114 into PCM data and provides the PCM data to the controller 100. In addition, the CODEC 112 receives a NEW MESSAGE (or call) alert (e.g., a ringtone) data from the controller 100, converts the NEW MESSAGE alert data into an analog audible signal, and outputs the analog audible signal to the speaker 116.

The RF module 120 down-converts an RF signal received through the antenna 118 and provides the resulting baseband signal to a baseband processor 122. Also, the RF module 120 up-converts a baseband signal provided from the baseband processor 122 and transmits the resulting RF signal through the antenna 118. The baseband processor 122 processes the baseband signals that are exchanged between the RF module 120 and the controller 100. In the case of Code Division Multiple Access (CDMA) communication, the baseband processor 122 performs channel coding and spreading on data to be transmitted, and performs despreading and channel decoding on received data.

The vibrator unit 124 includes a vibrating motor, and drives the vibrating motor under the control of the controller 100 to generate the NEW MESSAGE alert. Although not illustrated in FIG. 1, the portable wireless terminal further includes a silent lamp (or an LED) and turns on the silent lamp to generate the NEW MESSAGE alert.

Figure 2:
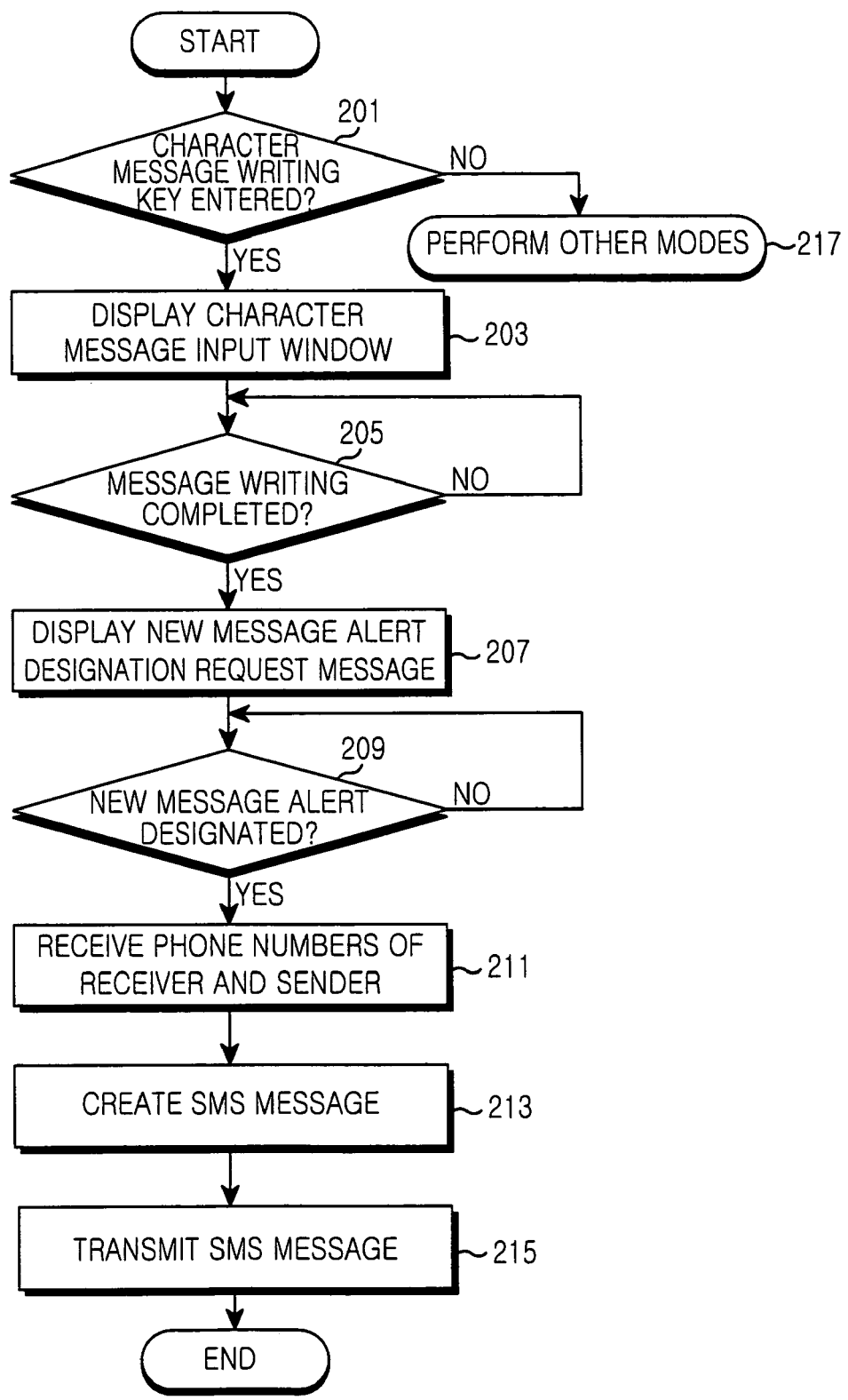
FIG. 2 is a flowchart illustrating a procedure for designating a NEW MESSAGE alert in an outgoing message in a portable wireless terminal, according to the present invention.

FIG. 2 is a flowchart illustrating a procedure for designating a NEW MESSAGE alert at an outgoing message in the portable wireless terminal, according to the present invention.

Referring to FIG. 2, the controller 100 determines in step 201 if a character message write key is pressed by a sending user. If so, the controller 100 proceeds to step 203, and if not, the controller 100 proceeds to step 217 to perform other modes (e.g., an idle mode). In step 203, the controller displays a character message input window on a screen of the display unit 110. At this point, the sending user writes a message by entering characters.

In step 205, the controller determines if the message writing is completed by the sending user. If so, the controller 100 proceeds to step 207, and if not, the controller 100 repeats step 205 until the message writing is completed. In step 207, the controller displays a NEW MESSAGE alert designation request message on the display screen. For example, the NEW MESSAGE alert designation request message may be "PLEASE SET NEW MESSAGE ALERT MODE→1: RINGTONE 2: VIBRATION 3: SILENCE 4: DISABLE".

In step 209, the controller 100 determines if a NEW MESSAGE alert is designated by the sending user. If so, the controller 100 proceeds to step 211, and if not, the controller 100 repeats step 209. In step 211, the controller 100 receives a receiver's phone number and a sender's phone number that are entered by the sending user.

In step 213, using the input data for message creation, the controller 100 creates an SMS message according to a predetermined standard. At this point, the controller 100 sets the designated NEW MESSAGE alert at a header of the SMS message. For example, the designated NEW MESSAGE alert may be set using a reserved section (or field) of the header.

In step 215, the controller 100 transmits the created SMS message to the receiver and ends the procedure.

Figure 3:
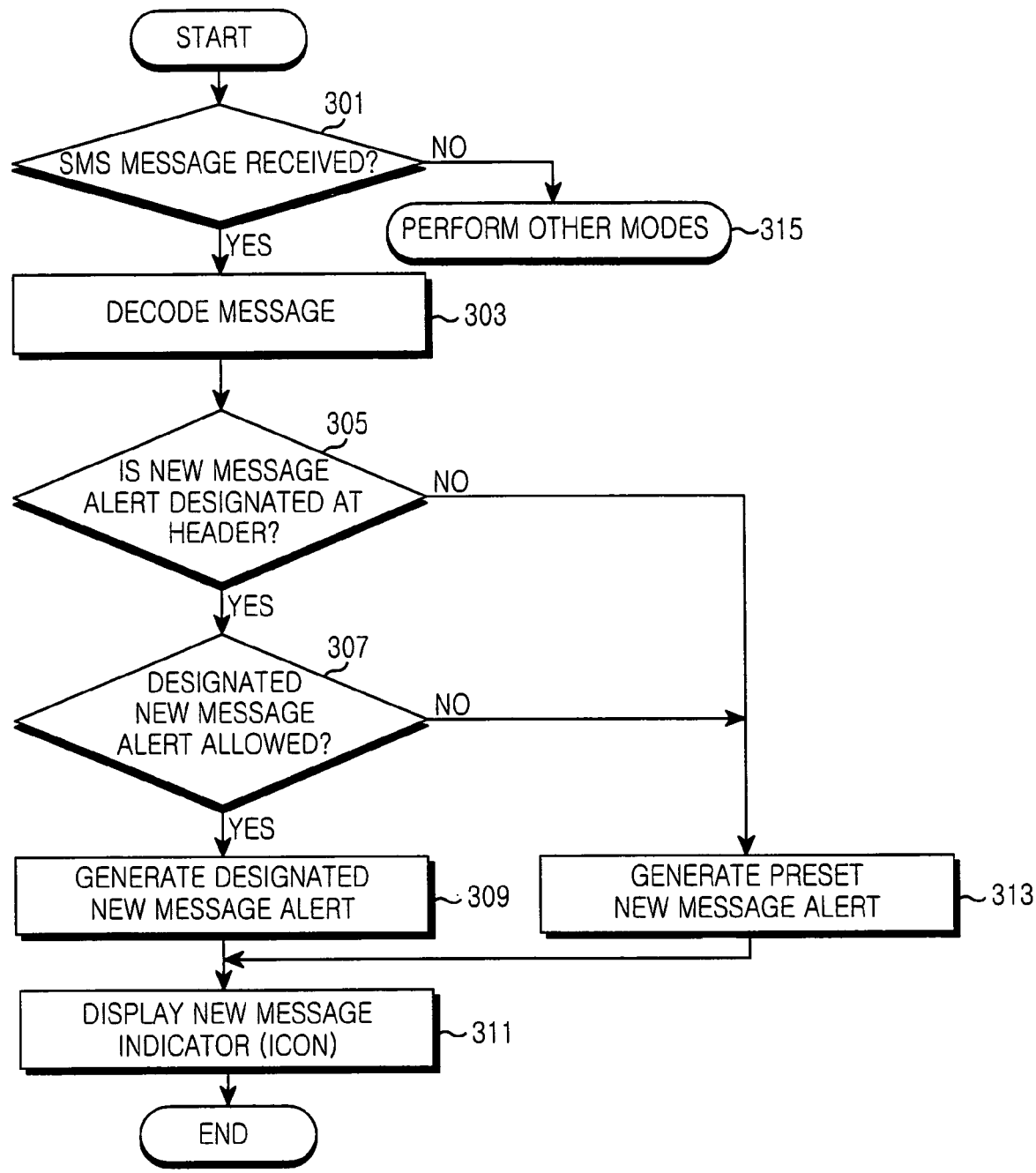
FIG. 3 is a flowchart illustrating a procedure for controlling a NEW MESSAGE alert in a portable wireless terminal by decoding a header of a received message, according to the present invention.

FIG. 3 is a flowchart illustrating a procedure for controlling a NEW MESSAGE alert in the portable wireless terminal by decoding a header of a received SMS message, according to the present invention.

Referring to FIG. 3, the controller 100 determines in step 301 if the portable wireless terminal receives an SMS message. If so, the controller 100 proceeds to step 303, and if not, the controller 100 proceeds to step 315 to perform other modes (e.g., an idle mode). In step 303, the controller 100 decodes a header of the SMS message.

In step 305, the controller 100 determines if a NEW MESSAGE alert is designated at the header of the SMS message. If so, the controller 100 proceeds to step 307, and if not, the controller 100 proceeds to step 313. The controller 100 generates, in step 313, a NEW MESSAGE alert preset by a receiving user, and then proceeds to step 311.

In step 307, the controller 100 determines whether to allow the designated NEW MESSAGE alert. Whether to allow the designated NEW MESSAGE alert is preset by the receiving user. This enables both the sending user and the receiving user to have equal authority over the NEW MESSAGE alert.

If the designated NEW MESSAGE alert is not allowed, the controller 100 generates the preset NEW MESSAGE alert in step 313 and then proceeds to step 311. On the other hand, if the designated NEW MESSAGE alert is allowed, the controller 100 generates the designated NEW MESSAGE alert in step 309 and proceeds to step 311. At this point, the NEW MESSAGE alert may be one of sound (or ringtone), vibration, and silence (lamp).

Thereafter, the controller 100 displays a NEW MESSAGE indicator (e.g., icon) on a display screen of the display unit 110 in step 311 and then ends the procedure.

The embodiments described above are characterized in that a sending side designates a NEW MESSAGE alert at a header of an SMS message and a receiving side analyzes the header of the SMS message to generate the designated NEW MESSAGE alert.

In another embodiment, a sending side writes an SMS message including a special character (e.g., a $ sign or other character) serving as a control code to transmit the SMS message to a receiving side, and the receiving side decodes the SMS message to generate a NEW MESSAGE alert designated by the special character.

Figure 4:
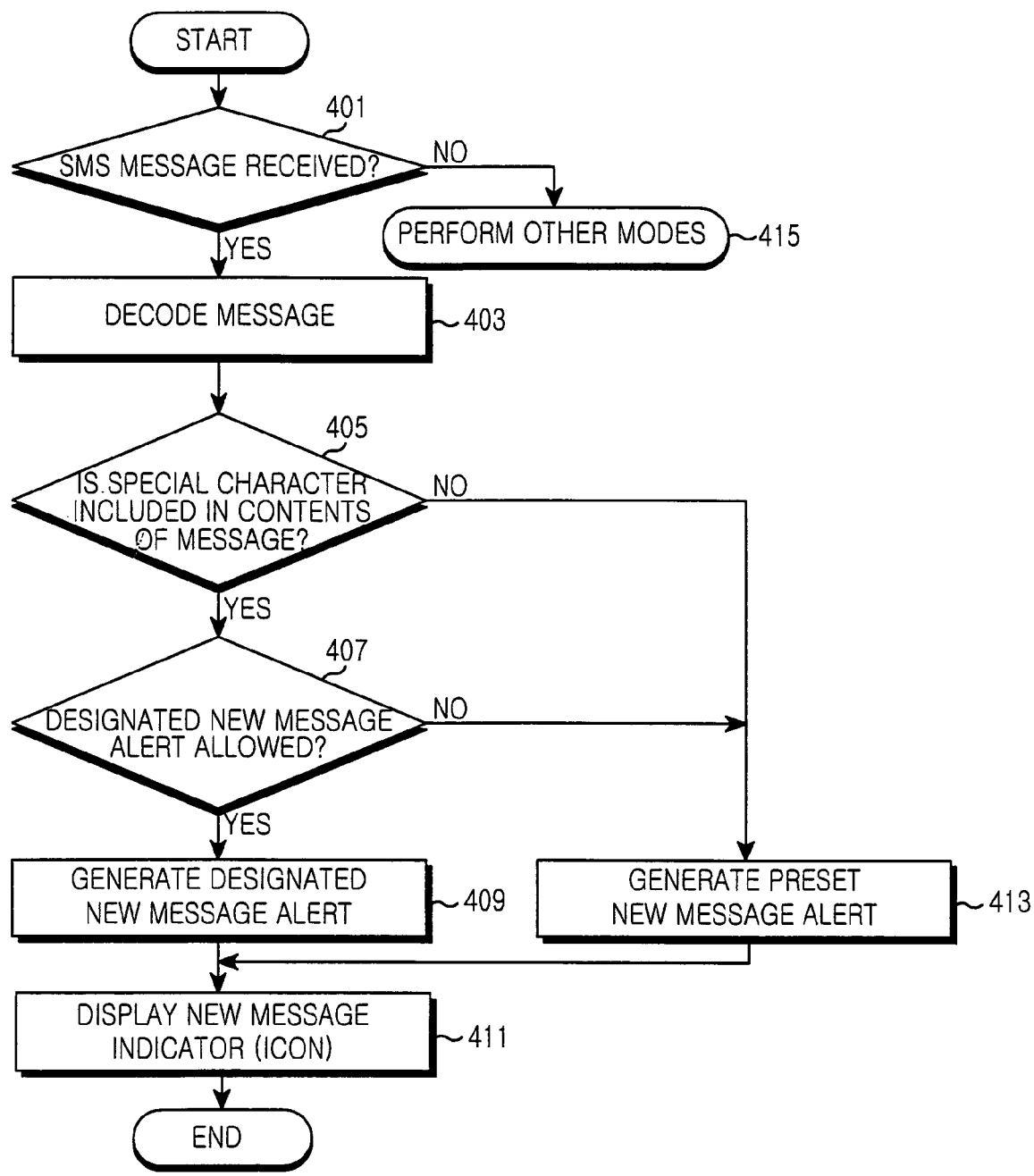
FIG. 4 is a flowchart illustrating a procedure for controlling a NEW MESSAGE alert in a portable wireless terminal by decoding a header of a received message, according to the present invention.

FIG. 4 is a flowchart illustrating a procedure for controlling a NEW MESSAGE alert in the portable wireless terminal by decoding a header of a received message, according to the present invention.

Referring to FIG. 4, the controller 100 determines in step 401 if the portable wireless terminal receives an SMS message. If so, the controller 100 proceeds to step 403, and if not, the controller 100 proceeds to step 415 to perform other modes (e.g., an idle mode). In step 403, the controller 100 decodes a header of the SMS message and the contents of the SMS message.

In step 405, the controller 100 determines if a special character designating a NEW MESSAGE alert is included in the contents of the SMS message. If so, the controller 100 proceeds to step 407, and if not, the controller 100 proceeds to step 413. The controller 100 generates, in step 413, a NEW MESSAGE alert preset by a receiving user, and then proceeds to step 411.

In step 407, the controller 100 determines whether to allow the designated NEW MESSAGE alert. Whether to allow the designated NEW MESSAGE alert is preset by the receiving user. This enables both the sending user and the receiving user to have equal authority over the NEW MESSAGE alert.

If the designated NEW MESSAGE alert is not allowed, the controller 100 generates the preset NEW MESSAGE alert in step 413 and then proceeds to step 411. On the other hand, if the designated NEW MESSAGE alert is allowed, the controller 100 generates the designated NEW MESSAGE alert in step 409 and proceeds to step 411. At this point, the NEW MESSAGE alert may be one of sound (or ringtone), vibration, and silence.

Thereafter, the controller 100 displays a NEW MESSAGE indicator (e.g., icon) on a display screen of the display unit 110 in step 411 and then ends the procedure.

As described above, the sending user can selectively enable/disable the NEW MESSAGE alert in consideration of the situation of the receiving user, thereby making it possible to consider the situation of the receiving user. That is, the present invention enables both the sending user and the receiving user to have equal authority over the NEW MESSAGE alert, thereby making it possible to enhance the convenience of the users.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for controlling a NEW MESSAGE alert in a portable wireless terminal, the method comprising the steps of:
   receiving a message and determining whether a NEW MESSAGE alert is designated at a header of the received message; and
   if a NEW MESSAGE alert is designated at the header of the received message, generating the designated NEW MESSAGE alert,
   wherein generating the designated NEW MESSAGE alert comprises:
   determining whether to allow the designated NEW MESSAGE alert;
   if the designated NEW MESSAGE alert is allowed, generating the designated NEW MESSAGE alert; and
   if the designated NEW MESSAGE alert is not allowed, generating a NEW MESSAGE alert that is preset in the portable wireless terminal.

2. The method of claim 1, further comprising, if a NEW MESSAGE alert is not designated at the header of the received message, generating a NEW MESSAGE alert that is preset in the portable wireless terminal.

3. The method of claim 1, wherein the NEW MESSAGE alert is one of sound, vibration, and silence.

4. The method of claim 1, wherein the message is one of a short message service (SMS) message, a multimedia messaging service (MMS) message, an enhanced messaging service (EMS) message, and an e-mail message.

5. A portable wireless terminal for controlling a NEW MESSAGE alert, comprising:
  a controller for, upon receipt of a message, determining whether a NEW MESSAGE alert is designated at a header of the received message and generating the designated NEW MESSAGE alert if the NEW MESSAGE alert is designated at the header of the received message, wherein generating the designated NEW MESSAGE alert comprises:
  determining whether to allow the designated NEW MESSAGE alert;
  if the designated NEW MESSAGE alert is allowed, generating the designated NEW MESSAGE alert; and
  if the designated NEW MESSAGE alert is not allowed, generating a NEW MESSAGE alert that is preset in the portable wireless terminal.

6. The portable wireless terminal of claim 5, wherein the NEW MESSAGE alert is one of sound, vibration, and silence.

* * * * *